United States Patent [19]

Buter

[11] Patent Number: 4,973,621
[45] Date of Patent: Nov. 27, 1990

[54] AQUEOUS COATING COMPOSITION BASED ON A DISPERSION OF AN ADDITION POLYMER, ESPECIALLY SUITED TO BE USED IN AN AQUEOUS BASE COAT

[75] Inventor: Roelof Buter, Dieren, Netherlands

[73] Assignee: Akzo N.V., Arnhem, Netherlands

[21] Appl. No.: 167,984

[22] Filed: Mar. 14, 1988

[30] Foreign Application Priority Data

Apr. 7, 1987 [NL] Netherlands ................. 8700809

[51] Int. Cl.$^5$ .............................................. C08F 2/16
[52] U.S. Cl. .................................... 524/460; 524/376; 524/458; 525/376
[58] Field of Search ................. 524/458, 460

[56] References Cited

U.S. PATENT DOCUMENTS

| | | | |
|---|---|---|---|
| 4,151,143 | 4/1979 | Blank et al. | 260/29.6 RW |
| 4,456,726 | 6/1984 | Siol et al. | 524/458 X |
| 4,465,803 | 8/1984 | Nakayama | 524/460 |
| 4,468,498 | 8/1984 | Kowalski et al. | 524/460 X |
| 4,613,633 | 9/1986 | Sekiya et al. | 524/460 X |
| 4,857,577 | 8/1989 | Buter | 524/460 X |

FOREIGN PATENT DOCUMENTS 0038127 10/1981 European Pat. Off. .
2060654 5/1981 United Kingdom .

Primary Examiner—Joseph L. Schofer
Assistant Examiner—J. M. Reddick
Attorney, Agent, or Firm—Oliff & Berridge

[57] ABSTRACT

Aqueous coating composition having a basis of a dispersion of an addition polymer (acting as binder), particularly as a base coat which is to be covered with a clear coat. To obtain layers having improved mechanical properties use is made of an addition polymeer which is obtained in two or more steps by emulsion polymerization. In a first step copolymerization is effected of 60-95 parts b.w., based on 100 parts b.w. of addition polymer, of a monomer mixture comprising (A) 65-100 mol % of a mixture of 60-100 mole % of a (cyclo)alkyl (meth)acrylate, in which the (cyclo)alkyl group contains 4-12 C-atoms, and 0-40 mole % of a di(cyclo)alkyl maleate and/or a di(cyclo)alkyl fumarate, in which the (cyclo)alkyl groups contain 4-12 C-atoms, and 0-35 mole % of another, copolymerizable, monoalkylenically unsaturated monomer, and in a subsequent step of 5-40 parts b.w., based on 100 parts b.w. of addition polymner, of a monomer mixture (B) of 10-60 mole % of (meth)acrylic acid and 40-90 mole % of another copolymerizable, monoalkylenically unsaturated monomer, the (meth)acrylic acid moieties being at least partially ionized.

13 Claims, No Drawings

AQUEOUS COATING COMPOSITION BASED ON A DISPERSION OF AN ADDITION POLYMER, ESPECIALLY SUITED TO BE USED IN AN AQUEOUS BASE COAT

An aqueous coating composition based on a dispersion of an addition polymer, especially suited to be used in an aqueous base coat The invention relates to an aqueous coating composition based on a dispersion of an addition polymer. Preferably, the aqueous dispersion is mixed with a metallic pigment such as aluminium, or a pigment such as a metal oxide-coated mica, so that coats of a metallic appearance may be obtained. In this way there is obtained a differential light reflection effect referred to as "flop". A problem with coating systems having a metallic appearance is to obtain a high flop as well as a high gloss. To obtain a high flop, the metallic pigment on application of the coating composition should be and should remain well oriented. To obtain a high gloss, the metallic pigment-containing coat is provided with an unpigmented, so-called clear coat. This system is generally called a "base coat/clear coat" system. In actual practice it is highly advisable that the base coat be sprayed with the clear coat, without prior curing of the base coat. Since the clear coat usually contains an organic solvent, steps should be taken to prevent a decrease of the flop as a result of the base coat being softened by organic solvent in the clear coat. If use is made of a base coat based on an organic solvent, cellulose acetobutyrate, for instance, may be used as an additive. A disadvantage to this additive, however, is that the base coat will have to contain a very large amount of organic solvent. On the other hand, aqueous base coats, which of course are much less harmful to the environment, have the disadvantage that a crosslinked polymer must be present as film-forming component (see EP-No. B1-0 038 127). A disadvantage to this presence, however, is that the coating composition will have poor film-forming properties, which may manifest itself in a coat of poor mechanical properties, such as little resistance to road metal.

The present invention now provides an aqueous coating composition which may be used as base coat in a base coat/clear coat system, where a coating system having good mechanical properties and a high flop as well as a high gloss may be obtained.

The coating composition according to the invention is characterized in that the addition polymer is a copolymer prepared in 2 or more steps by emulsion polymerization, and obtained by copolymerization in a first step of 60-95 parts by weight (calculated on 100 parts by weight of the addition polymer) of a monomer mixture A consisting of 65-100 mole % of a mixture of 60-100 mole % of a (cyclo)alkyl (meth)acrylate of which the (cyclo)alkyl group contains 4-12 carbon atoms, and 0-40 mole % of a di(cyclo)alkyl maleate and/or a di(cyclo)alkyl fumarate of which the (cyclo)alkyl groups contain 4-12 carbon atoms, and 0-35 mole % of a different, copolymerizable, monoethylenically unsaturated monomer, and by copolymerization in a subsequent step of 5-40 parts by weight (calculated on 100 parts by weight of the addition polymer) of a monomer mixture B of 10-60 mole % of (meth)acrylic acid and 40-90% of a different, copolymerizable, monoethylenically unsaturated monomer, with the carboxylic acid groups derived from the (meth)acrylic acid being at least partially ionized. Preferably, the addition polymer is obtained by copolymerization of 80-90 parts by weight of the monomer mixture A and 10-20 parts by weight of the monomer mixture B (both amounts being calculated on 100 parts by weight of the addition polymer). By emulsion polymerization is meant here the polymerization of an ethylenically unsaturated monomer in water in the presence of a watersoluble or waterinsoluble initiator and using 0,1-9 wt. % (calculated on the monomer) of an emulsifier.

As examples of (cyclo)alkyl (meth)acrylates suitable for use in monomer mixture A and having a (cyclo)alkyl group with 4-12 carbon atoms may be mentioned: butyl acrylate, butyl methacrylate, 2-ethylhexyl acrylate, 2-ethylhexyl methacrylate, octyl acrylate, octyl methacrylate, isobornyl acrylate, isobornyl methacrylate, dodecyl acrylate, dodecyl methacrylate, cyclohexyl acrylate, and cyclohexyl methacrylate. It is preferred that the monomer mixture A should contain 70-95, more particularly 80-95 mole % of the aforementioned (cyclo)alkyl (meth)acrylate. As examples of di(cyclo)alkyl maleates and/or fumarates with (cyclo)alkyl groups having 4-12 carbon atoms suitable for use in monomer mixture A may be mentioned: dibutyl maleate, dibutyl fumarate, 2-ethylhexyl maleate, 2-ethylhexyl fumarate, octyl maleate, isobornyl maleate, dodecyl maleate, and cyclohexyl maleate.

As suitable monomeric, monoethylenically unsaturated compounds of which maximally 35, and preferably 5-20 mole % may be used in the monomer mixture A may be mentioned: alkyl (meth)acrylates having fewer than 4 C-atoms in the alkyl group, such as methyl methacrylate, methyl acrylate, ethyl acrylate, ethyl methacrylate, propyl acrylate, propyl methacrylate, isopropyl acrylate; alkyl maleates and fumarates having fewer than 4 C-atoms in the alkyl groups, such as dimethyl maleate, diethyl maleate, diethyl fumarate, and dipropyl maleate; (meth)acrylates having ether groups such as 2-methoxyethyl methacrylate, 2-ethoxyethyl methacrylate, 3-methoxypropyl acrylate; hydroxyalkyl (meth)acrylates, e.g. 2-hydroxyethyl acrylate, 2-hydroxyethyl methacrylate, 2-hydroxypropyl acrylate, 2-hydroxypropyl methacrylate, 4-hydroxybutyl acrylate, 6-hydroxyhexyl acrylate, p-hydroxycyclohexyl acrylate, p-hydroxycyclohexyl methacrylate, hydroxypolyethylene glycol (meth)acrylates, hydroxypolypropylene glycol (meth)acrylates and the corresponding alkoxy derivatives thereof; epoxy (meth)acrylates, such as glycidyl acrylate, glycidyl methacrylate; monovinyl aromatic hydrocarbons, such as styrene, vinyl toluene, α-methyl styrene, vinyl naphthalene; also acrylamide and methacrylamide, acrylonitrile, methacrylonitrile, N-methylol acrylamide, N-methylol methacrylamide; N-alkyl (meth)acrylamides, such as N-isopropyl acrylamide, N-isopropyl methacrylamide, N-t-butyl acrylamide, N-t-octyl acrylamide, N,N-dimethyl aminoethyl methacrylate, N,N-diethyl aminoethyl methacrylate; monomers, such as vinyl chloride, vinyl acetate, vinyl propionate, and monomers containing one or more urea or urethane groups, such as for instance the reaction product of 1 mole of isocyanatoethyl methacrylate and 1 mole of butylamine, 1 mole of benzylamine, 1 mole of butanol, 1 mole of 2-ethylhexanol, and 1 mole of methanol, respectively. Mixtures of these compounds may also be used. Since, in the first step a non-crosslinked polymer should be formed, the monomers in the monomer mixture A do not contain any groups which react with each other.

As examples of monoethylenically unsaturated compounds which may be used in the monomer mixture B in addition to the (meth)acrylic acid may be mentioned: monovinyl aromatic hydrocarbons, such as styrene, vinyl toluene, α-methyl styrene, and vinyl naphthalene; nitriles, such as acrylonitrile, methacrylonitrile; acrylic or methacrylic esters, such as methyl methacrylate, methyl acrylate, ethyl acrylate, ethyl methacrylate, propyl acrylate, propyl methacrylate, isopropyl acrylate, butyl acrylate, butyl methacrylate, 2-hydroxyethyl acrylate, 2-hydroxyethyl methacrylate, 2-hydroxypropyl acrylate, 2-hydroxypropyl methacrylate, 4-hydroxybutyl acrylate, 6-hydroxyhexyl acrylate, p-hydroxycyclohexyl acrylate, 2-ethylhexyl acrylate, 2-methoxyethyl methacrylate, 2-ethoxyethyl methacrylate, 3-methoxypropyl acrylate; hydroxypolyethylene glycol (meth)acrylates, hydroxypolypropylene glycol (meth)acrylates and the corresponding alkoxy derivatives thereof; ethylenically unsaturated monocarboxylic acids such as crotonic acid and itaconic acid, and compounds such as vinyl chloride, vinyl acetate, vinyl propionate, vinyl pyrrolidone, acrylamide, methacrylamide, N-alkyl (meth)acrylamides such as N-isopropyl acrylamide, N-t-butyl acrylamide, N-t-octyl acrylamide. Mixtures of these compounds may also be used. It is preferred that the monomer mixture B should contain 15–50, more particularly 20–40 mole % of (meth)acrylic acid and 50–85, more particularly 60–80 mole % of the different, copolymerizable, ethylenically unsaturated monomer. Copolymerization of the monomer mixture B will generally yield a copolymer having an acid number of 30–450 and preferably of 60–350, and a hydroxyl number of 0–450 and preferably of 60–300. Both the acid number and the hydroxyl number are expressed in mg of KOH per g of copolymer. Optionally, different monomer mixtures A and/or B may be used successively.

The emulsifiers of which use is preferably made in the emulsion polymerization are of an anionic or non-ionic nature. Examples of anionic emulsifiers include: potassium laurate, potassium stearate, potassium oleate, sodium decyl sulphate, sodium dodecyl sulphate, and sodium rosinate. Examples of non-ionic emulsifiers include: linear and branched alkyl and alkylaryl polyethylene glycol, and polypropylene glycol ethers and thioethers, alkyl phenoxypoly(ethyleneoxy) ethanols such as the adduct of 1 mole of nonyl phenol to 5–12 moles of ethylene oxide, or the ammonium salt of the sulphate of this adduct. Also, in emulsion polymerization, the conventional radical initiators may be used in the usual amounts. Examples of suitable radical initiators include: ammonium persulphate, sodium persulphate, potassium persulphate, bis(2-ethylhexyl) peroxydicarbonate, di-n-butyl peroxydicarbonate, t-butyl perpivalate, t-butyl hydroperoxide, cumene hydroperoxide, dibenzoyl peroxide, dilauroyl peroxide, 2,2'-azobisisobutyronitrile, and 2,2'-azobis-2-methylbutyronitrile. As suitable reducing agents which may be used in combination with e.g. a hydroperoxide may be mentioned: ascorbic acid, sodium sulphoxylate formaldehyde, thiosulphates, bisulphates, hydrosulphates, watersoluble amines such as diethylene triamine, triethylene tetraamine, tetraethylene pentamine, N,N'-dimethyl ethanolamine, N,N-diethyl ethanolamine, and reducing salts such as cobalt, iron, nickel, and copper sulphate. Optionally, a chain length regulator, for instance n-octyl mercaptan, dodecyl mercaptan, 3-mercaptopropionic acid, may also be used.

Copolymerization of the monomer mixtures generally is carried out at atmospheric pressure at a temperature of 40°–100° C., preferably 60°–90° C., in an atmosphere of an inert gas, such as nitrogen. Optionally, however, copolymerization may also be carried out at elevated pressure and at a temperature of 40°–100° C. or higher.

According to the invention the carboxylic acid groups derived from the acrylic acid and/or methacrylic acid are at least 40–100% ionized by the addition of 0.5–1.5, preferably 0.8–1.3 equivalents of an ionizing agent per equivalent of carboxylic acid group. As suitable ionizing agents for the carboxylic acid may be mentioned ammonia and amines such as N,N-dimethyl ethanolamine, N,N-diethyl ethanolamine, triethyl amine, and morpholine. It is preferred that the ionizing of the carboxylic acid groups should be carried out after the polymerization.

The coats obtained from the dispersions according to the present invention may be cured by physical drying. Alternatively, however, the coats may be cured if the addition polymer contains hydroxyl groups and the aqueous dispersion contains a curing agent which reacts with hydroxyl groups. Examples of suitable curing agents include N-methylol and/or N-methylol ether groups-containing aminoplasts obtained by reacting an aldehyde, for instance formaldehyde, with an amino or amido groups-containing compound such as melamine, urea, N,N'-ethylene urea, dicyanodiamide, and benzoguanamine. The resulting compounds are preferably wholly or partially etherified with alcohols having 1–6 carbon atoms, such as methanol, ethanol, n-propanol, isopropanol, n-butanol, isobutanol, amyl alcohol, hexanol, or mixtures thereof. Especially favourable results may be obtained when using a methylol melamine having 4–6 methyl groups per molecule of melamine, at least 3 methylol groups being etherified with butanol or a butanol etherified condensation product of formaldehyde and N,N'-ethylene diurea. Examples of other suitable curing agents include water-dispersible, blocked polyisocyanates, such as a methyl ethyl ketoxime-blocked, isocyanate group-containing adduct of a polyisocyanate to a hydroxycarboxylic acid, e.g. dimethylol propionic acid.

The dispersions according to the invention may be applied to a substrate in any desirable manner, such as by roller coating, spraying, brushing, sprinkling, flow coating, dipping, (electrostatic) spraying, or electrophoresis. Suitable substrates may be made of wood, metal, and synthetic material. Curing may be carried out at ambient temperature or, optionally, at elevated temperature to reduce the curing time. Optionally, the composition may be baked at higher temperatures in the range of, for instance, 60° to 160° C., in a baking oven over a period of 10 to 60 minutes.

The aqueous dispersions of the addition polymer according to the present invention are extremely suitable for applying coating compositions of a high gloss metallic appearance (the so-called base coat/clear coat system). To this end the aqueous dispersions according to the invention are used in the base coat in combination with so-called "non-leafing" aluminium paste or some other metallic pigment. In addition, the base coat may contain the conventional additives and adjuvants, such as other pigments, dispersing agents, dyes, organic solvents, and accelerators for the curing reaction. As suitable organic solvents may be mentioned such ether group-containing alcohols as butoxyethanol, 1- methoxy-propanol-2, 1-ethoxy-propanol-2, 1-propoxy-propanol-2, 1-butoxy-propanol-2, and 1-isobutoxy-propanol-2; alcohols, such as methanol and hexanol; diols, such as ethylene glycol and diethylene glycol. The applicable pigments may have an acid, a neutral or a basic character. Optionally, the pigments may be pretreated to modify the properties. Examples of suitable pigments include metallic pigments such as aluminium and stainless steel; nacreous pigments, such as mica coated with a metal oxide such as iron oxide and/or titanium dioxide; inorganic pigments, such as titanium dioxide, iron oxide, carbon black, silica, kaolin, talc, barium sulphate, lead silicate, strontium chromate, and chromium oxide; and organic pigments, such as phthalocyanine pigments. Use of the aqueous dispersions according to the invention may prevent the base coat from being softened by the clear coat after being sprayed with it, so that the metallic effect will not be lost. If a "metallic" effect is not desired, then instead of a metallic pigment any other suitable type of pigment may be used.

The water-dilutable dispersions according to the invention may be used as such or in combination with such water-dilutable materials as alkyd resins, polyesters, or polyurethanes in a metallic base coat. In combination with a base coat based on the dispersion according to the invention the clear coat used may for instance be a clear baking lacquer of a conventional acrylate/melamine composition. This system is generally cured in a baking oven for 20–30 minutes at a temperature of 80°–160° C.

The invention will be further described in the following examples and comparative examples, which must not be construed as limiting the scope of the present invention. The mean particle size of the dispersions was determined by dynamic light scattering, the dispersion being diluted with water to a solids content of about 0.1 wt. %. The viscosity was determined with a Brookfield viscometer. The solids content is determined in accordance with ASTM method D 1644-59 with heating at 130° C. over a period of 30 minutes. As a representative example of the conventional and suitable emulsifiers there was used in all examples a 30 wt. % aqueous solution of the ammonium sulphate of the adduct of 1 molecule of nonyl phenol to 9 molecules of ethylene oxide. The flop was measured by M.A.T. (Metallic Appearance Tester), a flop $\geq 30$ being high and a flop of 20 low. For an automotive lacquer 30 would be an acceptable flop value, and 25 would clearly be unacceptable. When measuring the flop by M.A.T. a light beam originating from a light source L is directed at a coat-covered plate at an angle $\alpha$ to the normal. The light reflected in the direction of the normal is received by a photomultiplier, which converts it into an electric signal, the reflection. The extent to which the reflection is reduced as the angle $\alpha$ increases is dependent on the orientation of the pigment particles in the coat. The more pigment particles are capable also for wider angles $\alpha$ of reflecting light to the measuring cell, the less the reflection will decrease, and the poorer the aluminium orientation will be. The product of the reflection R and the cosine of the angle $\alpha$ is plotted against the angle $\alpha$. The curve is found to satisfy the formula $$R \cdot \cos \alpha = C \cdot 10^F$$

with F representing the flop and C a constant. By plotting this equation logarithmically, a straight line is obtained, the slope of which denotes the flop and the intercept with the y-axis denotes the constant C.

EXAMPLE 1

Preparation of copolymer in Step 1

A 2 l flask fitted with a stirrer, a thermometer, a reflux condenser, and dropping funnels A, B and C was filled with:
510 g of demineralized water
2.0 g of monomer mixture I (see Table 1)
1.33 g of emulsifier
Dropping funnel A was filled with:
253.0 g of monomer mixture I
Dropping funnel B was filled with a homogeneous mixture of:
128 g of demineralized water
0.78 g of ammonium persulphate
2.92 g of emulsifier
Dropping funnel C was filled with a homogeneous mixture of:
20 g of demineralized water and
0.24 g of ammonium persulphate After deaeration the contents of both the flask and the dropping funnels were brought under a nitrogen atmosphere, and the contents of the flask were heated to 85° C. Next, the contents of dropping funnel C were introduced into the flask over a period of 2 minutes. After the contents of the flask had been kept at 85° C. for 30 minutes, the contents of dropping funnels A and B were introduced into the flask at a constant rate over a period of 4 hours, after which the contents of the flask were kept at 85° C. for another 2 hours.

Preparation of copolymer in Step 2

Dropping funnel A was filled with:
45 g of monomer mixture II (see Table 1)
and dropping funnel B was filled with a homogeneous mixture of:
45 g of demineralized water
0.75 g of emulsifier
0.225 g of ammonium persulphate
0.225 g of sodium metaborate ($NaBO_2 \cdot 4H_2O$)

Over a period of 45 minutes the contents of the two dropping funnels were introduced at a constant rate into the flask filled with the polymer dispersion according to Step 1, the contents of the flask being kept at a temperature of 85° C. Subsequently, the contents of the flask were kept at this temperature for 2 more hours. The reaction was carried out under a nitrogen atmosphere.

On conclusion of the reaction the contents of the flask were cooled to ambient temperature, after which there were successively added dropwise the following components:
500 g of demineralized water
17 g of butoxyethanol
and a mixture of
6.75 g of N,N-dimethyl ethanolamine and
150 g of demineralized water The properties of the resulting dispersion are given in Table II.

EXAMPLE 2

Example 1 was repeated, except that use was made of monomer mixture III instead of monomer mixture I (see Table I). The properties of the resulting polymer dispersion are given in Table II.

EXAMPLE 3

Example 1 was repeated, except that use was made of monomer mixture IV instead of monomer mixture I (see Table I). The properties of the resulting polymer dispersion are given in Table II.

EXAMPLE 4

Example 1 was repeated, except that use was made of monomer mixture V instead of monomer mixture I (see Table I). The properties of the resulting polymer dispersion are given in Table II.

EXAMPLE 5

Example 1 was repeated, except that use was made of monomer mixture VI instead of monomer mixture I (see Table I). The properties of the resulting polymer dispersion are listed in Table II.

EXAMPLE 6

Example 1 was repeated, except that use was made of monomer mixture VII instead of monomer mixture I (see Table I). The properties of the resulting polymer dispersion are listed in Table II.

EXAMPLE 7

Preparation of copolymer in Step 1

A 2 l flask fitted with a stirrer, a thermometer, a reflux condenser, and dropping funnels A, B, C and D was filled with:
419 g of demineralized water
2.0 g of monomer mixture VIII (see Table I)
1.33 g of emulsifier
Dropping funnel A was filled with:
210.8 g of monomer mixture VIII (see Table I)
Dropping funnel B was filled with a homogeneous mixture of:
120 g of demineralized water
12.2 g of acrylamide
2.42 g of emulsifier
Dropping funnel C was filled with a homogeneous mixture of:
120 g of demineralized water and
0.66 g of ammonium persulphate
Dropping funnel D was filled with a homogeneous mixture of:
20 g of demineralized water and
0.24 g of ammonium persulphate After deaeration the contents of both the flask and the dropping funnels were brought under a nitrogen atmosphere, and the contents of the flask were heated to 85° C. Next, the contents of dropping funnel D were introduced into the flask over a period of 2 minutes. After the contents of the flask had been kept at a temperature of 85° C. for 30 minutes, the contents of dropping funnels A, B and C were introduced into the flask at a constant rate over a period of 3 hours, after which the contents of the flask were kept at that temperature for a further 2 hours.

Preparation of copolymer in Step 2

Dropping funnel A was filled with:
37.5 g of monomer mixture I
and dropping funnel B was filled with a homogeneous mixture of:
113 g of demineralized water
0.15 g of ammonium persulphate
0.63 g of emulsifier Over a period of 30 minutes the contents of the two dropping funnels were introduced at a constant rate into the flask filled with the polymer dispersion according to Step 1, the contents of the flask being kept at a temperature of 85° C. Then the contents of the flask were kept at said temperature for another 2 hours. The reaction was carried out under a nitrogen atmosphere.

Preparation of copolymer in Step 3

Dropping funnel A was filled with:
37.5 g of monomer mixture II
and dropping funnel B was filled with a homogeneous mixture of:
113 g of demineralized water
0.63 g of emulsifier
0.19 g of ammonium persulphate
0.9 g of sodium metaborate Over a period of 30 minutes the contents of the two dropping funnels were introduced at a constant rate into the flask filled with the polymer dispersion according to Step 2, the contents of the flask being kept at 85° C., after which the contents of the flask were kept at this temperature for a further 2 hours. The reaction was carried out under a nitrogen atmosphere. On conclusion of the reaction the contents of the flask were cooled to ambient temperature, after which there were successively added dropwise the following components:
299 g of demineralized water
17 g of butoxyethanol
and a mixture of
5.63 g of N,N-dimethyl ethanolamine and
150 g of demineralized water The properties of the resulting dispersion are given in Table II.

EXAMPLE 8

Example 7 was repeated, except that in Step 1 an amount of 208.4 g of monomer mixture VIII was used instead of 210.8 g (dropping funnel A) and an amount of 14.5 g of methacrylamide was used instead of 12.2 g (dropping funnel B). The properties of the resulting dispersion are given in Table II.

EXAMPLE 9

Example 7 was repeated, except that use was made of 37.5 g of monomer mixture III instead of 37.5 g of monomer mixture I in Step 2. The properties of the resulting dispersion are given in Table II.

EXAMPLE 10

Example 7 was repeated, except that in Step 1 the flask was filled with:
464 g of demineralized water
2.0 g of monomer mixture VIII
1.33 g of emulsifier
Dropping funnel A was filled with:
225.0 g of monomer mixture VIII
Dropping funnel B was filled with a homogeneous mixture of:
120 g of demineralized water
13.0 g of acrylamide
2.67 g of emulsifier
Dropping funnel C was filled with a homogeneous mixture of:
120 g of demineralized water and
0.66 g of ammonium persulphate Dropping funnel D was filled with a homogeneous mixture of:
20 g of demineralized water and
0,24 g of ammonium persulphate In Step 2 dropping funnel A was filled with:
32.0 g of monomer mixture IX (see Table I)

Dropping funnel B was filled with a homogeneous mixture of
97 g of demineralized water
0.16 g of ammonium persulphate
0.53 g of emulsifier In Step 3 dropping funnel A was filled with:
48.0 g of monomer mixture II Dropping funnel B was filled with a homogeneous mixture of:
145 g of demineralized water
0.80 g of emulsifier
0.24 g of ammonium persulphate
0.24 g of sodium metaborate On conclusion of the reaction the following components were successively introduced dropwise into the reactor:
342 g of demineralized water
54 g of n-butanol
and a mixture of
7.2 g of N,N-dimethyl ethanolamine and
100 g of demineralized water The properties of the resulting dispersion are given in Table II.

EXAMPLE 11

Step 1 of Example 1 was repeated, except that the flask was filled with:
327 g of demineralized water
2.0 g of monomer mixture X (see Table I)
1.33 g of emulsifier Dropping funnel A was filled with:
238.0 g of monomer mixture X (see Table I)

Dropping funnel B was filled with a homogeneous mixture of:
100 g of demineralized water
0.72 g of ammonium persulphate
2.67 g of emulsifier Dropping funnel C was filled with a homogeneous mixture of:
20 g of demineralized water and
0.24 g of ammonium persulphate The second step in this example was carried out in the same way as Step 2 according to Example 7, with, of course, the flask being filled with the dispersion prepared according to the first step, and with dropping funnel A being filled with 32.0 g of monomer mixture XI (see Table I).

Dropping funnel B was filled with a homogeneous mixture of:
60 g of demineralized water
0.48 g of ammonium persulphate
0.53 g of emulsifier On conclusion of the polymerization reaction in Step 2 there were added to the contents of the flask 184 g of demineralized water, after which Step 3 was carried out.

Step 3

Step 3 was carried out in the same way as Step 3 in Example 7, except that dropping funnel A was filled with:
48 g of monomer mixture II (see Table I)

and dropping funnel B was filled with a homogeneous mixture of:
60 g of demineralized water
0.80 g of emulsifier
0.24 g of ammonium persulphate
0.24 g of sodium metaborate On conclusion of the reaction the following components were successively added dropwise:
558 g of demineralized water
53 g of n-butanol
and a mixture of
7.2 g of N,N-dimethyl ethanolamine
100 g of demineralized water The properties of the resulting dispersion are given in Table II.

EXAMPLE 12

Example 11 was repeated, except that use was made of monomer mixture XII instead of monomer mixture X (see Table I) in Step 1. The properties of the resulting dispersion are given in Table II.

COMPARATIVE EXAMPLE 1

Example 11 was repeated, except that use was made of monomer mixture XIII (see Table I) instead of monomer mixture X. The properties of the resulting dispersion are given in Table II.

COMPARATIVE EXAMPLE 2

Example 11 was repeated, except that use was made of monomer mixture XIV (see Table I) instead of monomer mixture X. The properties of the resulting dispersion are given in Table II.

COMPARATIVE EXAMPLE 3

Example 10 was repeated, except that use was made of monomer mixture XIII (see Table I) instead of monomer mixture VIII. The properties of the resulting dispersion are given in Table II

TABLE I

| | Monomer compositions |
|---|---|
| I | 0,50 moles of butyl methacrylate |
| | 0,35 moles of butyl acrylate |
| | 0,05 moles of 2-hydroxypropyl methacrylate |
| | 0,10 moles of methyl methacrylate |
| II | 0,23 moles of methacrylic acid |
| | 0,33 moles of butyl acrylate |
| | 0,24 moles of 2-hydroxypropyl methacrylate |
| | 0,20 moles of methyl methacrylate |
| III | 0,50 moles of butyl methacrylate |
| | 0,20 moles of 2-ethylhexyl acrylate |
| | 0,15 moles of butyl acrylate |
| | 0,05 moles of 2-hydroxypropyl methacrylate |
| | 0,10 moles of methyl methacrylate |
| IV | 0,45 moles of butyl methacrylate |
| | 0,35 moles of butyl acrylate |
| | 0,05 moles of adduct of 1 mole of isocyanatoethyl methacrylate to 1 mole of 2-ethylhexanol-1 |
| | 0,05 moles of 2-hydroxypropyl methacrylate |
| | 0,10 moles of methyl methacrylate |
| V | 0,50 moles of butyl methacrylate |
| | 0,35 moles of butyl acrylate |
| | 0,05 moles of glycidyl methacrylate |
| | 0,10 moles of methyl methacrylate |
| VI | 0,625 moles of butyl methacrylate |
| | 0,225 moles of butyl acrylate |
| | 0,05 moles of 2-hydroxypropyl methacrylate |
| | 0,10 moles of methyl methacrylate |
| VII | 0,75 moles of butyl methacrylate |
| | 0,10 moles of butyl acrylate |
| | 0,05 moles of 2-hydroxypropyl methacrylate |
| | 0,10 moles of methyl methacrylate |
| VIII | 0,50 moles of butyl methacrylate |

TABLE I-continued

| | Monomer compositions |
|---|---|
| IX | 0,35 moles of butyl acrylate<br>0,05 moles of 2-hydroxypropyl methacrylate<br>0,50 moles of styrene<br>0,20 moles of methyl methacrylate<br>0,30 moles of 2-hydroxyethyl acrylate |
| X | 0,45 moles of butyl acrylate<br>0,40 moles of butyl methacrylate<br>0,05 moles of 2-hydroxypropyl methacrylate<br>0,10 moles of methyl methacrylate |
| XI | 0,20 moles of styrene<br>0,30 moles of butyl methacrylate<br>0,45 moles of methyl methacrylate<br>0,05 moles of 2-hydroxypropyl methacrylate |
| XII | 0,40 moles of butyl acrylate<br>0,45 moles of butyl methacrylate<br>0,05 moles of 2-hydroxypropyl methacrylate<br>0,05 moles of acrylonitrile |
| XIII | 0,45 moles of methyl methacrylate<br>0,50 moles of butyl acrylate<br>0,05 moles of 2-hydroxypropyl methacrylate |
| XIV | 0,40 moles of methyl methacrylate<br>0,05 moles of 2-hydroxypropyl methacrylate<br>0,50 moles of butyl acrylate<br>0,05 moles of acrylonitrile |

TABLE II

Properties of the aqueous dispersions

| Dispersion | Solids content (wt. %) | Viscosity (Pa.s) | pH | Mean particle size (nm) |
|---|---|---|---|---|
| according to Example | | | | |
| 1 | 17,75 | 0,98 | 7,18 | 169 |
| 2 | 17,50 | 1,30 | 7,13 | 169 |
| 3 | 17,85 | 0,31 | 7,12 | 144 |
| 4 | 17,95 | 0,35 | 7,10 | 254 |
| 5 | 18,00 | 0,60 | 7,23 | 162 |
| 6 | 18,00 | 0,49 | 7,25 | 157 |
| 7 | 17,75 | 1,51 | 7,20 | 151 |
| 8 | 18,00 | 0,14 | 7,47 | 142 |
| 9 | 17,70 | 0,97 | 7,39 | 145 |
| 10 | 17,65 | >10 | 7,22 | 145 |
| 11 | 17,13 | 0,87 | 6,98 | 151 |
| 12 | 17,45 | 0,95 | 7,11 | 133 |
| according to Comparative Example | | | | |
| 1 | 17,75 | 0,91 | 7,13 | 112 |
| 2 | 17,71 | 1,74 | 7,08 | 104 |
| 3 | 17,75 | >10 | 7.25 | 125 |

Base coat compositions

For all the aqueous dispersions in Examples 1 through 12 and Comparative Examples 1 through 3 a base coat composition was prepared as follows. A mixture of:

22 g of aluminium paste (available under the trademark 5000 AR of Silberline)
40 g of butoxyethanol was added with stirring to a mixture of:

350 g of aqueous polymer dispersion (solids content approx. 18 wt. %) according to one of the preceding examples
7 g of hexamethoxymethyl melamine The base coat compositions were brought to a pH of 7.5 by the addition of N,N-dimethyl ethanolamine and diluted with a mixture of water and butoxyethanol in a weight ratio of 7:1 to spraying viscosity (efflux time of 35 sec. in DIN-cup No. 4). The solids contents of all the base coat compositions were in the range of 16 to 18 wt. %.

In an atmosphere having a relative humidity of 65% the base coat coating compositions were sprayed onto steel test panels (Bonder 130) in a film thickness of 15–20 μm (in the dry state). The resulting test panels were predried for 15 minutes in a baking oven at a temperature of 60° C. Next, these test panels were partially covered up and the remaining part was repainted by spraying with a conventional clear coat (in a film thickness of 40–45 μm in the dry state). This clear coat was a so-called two-component acrylate/polyisocyanate coating composition, with the polyisocyanate being the adduct of 3 moles of hexamethylene diisocyanate to 1 mole of water. After curing in a baking oven for 20 minutes at 120° C. a metallic coat of high gloss was obtained, with an excellent resistance both to organic solvents and water. Of the metallic coats the flop of both the base coat and the base coat provided with clear coat was measured (see Table III). The decrease of the flop through the application of the clear coat is a measure of the softening of the base coat by the clear coat, thus reducing the flop. The flop values of the base coats based on the aqueous dispersions according to the invention (Examples 1 through 12) are all very high. The decrease of the flop by the application of the clear coat is small, so that a high flop of about 30 is maintained. The flop values compare with or are superior to those of well-known aqueous base coats and base coat/clear coat systems. The flop values of the base coats and base coats/clear coats based on the dispersions from the Comparative Examples are clearly substandard.

TABLE III

Flop values

| Base-coat on the basis of an aqueous dispersion | Flop of base-coat × (−1000) | Flop of base-coat + clear-coat × (−1000) | Decrease of the flop × (−1000) |
|---|---|---|---|
| according to Example | | | |
| 1 | 31,7 | 28,8 | 2,9 |
| 2 | 34,1 | 30,7 | 3,4 |
| 3 | 29,8 | 27,7 | 2,1 |
| 4 | 33,1 | 31,2 | 1,9 |
| 5 | 34,6 | 32,2 | 2,4 |
| 6 | 35,9 | 31,5 | 4,4 |
| 7 | 37,3 | 32,0 | 5,3 |
| 8 | 33,1 | 28,8 | 4,3 |
| 9 | 36,7 | 29,8 | 6,9 |
| 10 | 33,1 | 27,5 | 5,6 |
| 11 | 32,3 | 30,6 | 1,7 |
| 12 | 31,1 | 27,9 | 3,2 |
| according to Comparative Example | | | |
| 1 | 31,7 | 24,5 | 7,2 |
| 2 | 32,0 | 24,8 | 7,2 |
| 3 | 30,2 | 22,3 | 7,9 |

I claim:

1. An aqueous coating composition based on a dispersion of an addition polymer, characterized in that the addition polymer is a polymer prepared in 2 or more steps by emulsion polymerization, and obtained by copolymerization in a first step of 60–95 parts by weight (calculated on 100 parts by weight of the addition polymer) of a monomer mixture A consisting of 65–100 mole % of a mixture of 60–100 mole % of a (cyclo)alkyl (meth)acrylate of which the (cyclo)alkyl group contains 4–12 carbon atoms, and 0–40 mole % of a di(cyclo)alkyl maleate and 0–40 mole percent of a di(cyclo)alkyl fumarate of which the (cyclo)alkyl groups contain 4–12 carbon atoms, and 0-35 mole % of a different copolymerizable, monoethylenically unsaturated monomer, and by copolymerization in a subsequent step of 5-40 parts by weight (calculated on 100 parts by weight of the addition polymer) of a monomer mixture B of 10-60 mole % of (meth)acrylic acid and 40-90 mole % of a different copolymerizable, monoethylenically unsaturated monomer, and with the carboxylic acid groups derived from the (meth)acrylic acid being at least partially ionized.

2. A coating composition according to claim 1, characterized in that the monomer mixture A contains 70-95 mole % of (cyclo)alkyl (meth)acrylate.

3. A coating composition according to claim 1, characterized in that the monomer mixture A contains 80-95 mole % of (cyclo)alkyl (meth)acrylate.

4. A coating composition according to claim 1, characterized in that the monomer mixture B contains 15-50 mole % of (meth)acrylic acid.

5. A coating composition according to claim 4, characterized in that the monomer mixture B contains 20-40 mole % of (meth)acrylic acid.

6. A coating composition according to claim 1, characterized in that the addition polymer is obtained by copolymerization of 80-90 parts by weight of the monomer mixture A and 10-20 parts by weight of the monomer mixture B (both amounts being calculated on 100 parts by weight of the addition polymer).

7. An aqueous base coat based on the coating composition according to claim 1.

8. A base coat according to claim 7, characterized in that one or more pigments are present.

9. A base coat according to claim 8, characterized in that one pigment is metallic.

10. A base coat according to claim 8, characterized in that the pigments are organic.

11. An aqueous dispersion of an addition polymer, characterized in that the addition polymer is a polymer prepared in 2 or more steps by emulsion polymerization, and obtained by copolymerization in a first step of 60-95 parts by weight (calculated on 100 parts by weight of the addition polymer) of a monomer mixture A consisting of 65-100 mole % of a mixture of 60-100 mole % of a (cyclo)alkyl (meth)acrylate of which the (cyclo)alkyl group contains 4-12 carbon atoms, and 0-40 mole % of a di(cyclo)alkyl maleate and 0-40 mole percent of a di(cyclo)alkyl fumarate of which the (cyclo)alkyl groups contain 4-12 carbon atoms, and 0-35 mole % of a different copolymerizable, monoethylenically unsaturated monomer, and by copolymerization in a subsequent step of 5-40 parts by weight (calculated on 100 parts by weight of the addition polymer) of a monomer mixture B of 10-60 mole % of (meth)acrylic acid and 40-90 mole % of a different copolymerizable, monoethylenically unsaturated monomer, and with the carboxylic acid groups derived from the (meth)acrylic acid being at least partially ionized.

12. A base coat according to claim 8 characterized in that the pigments are inorganic.

13. A base coat according to claim 8, characterized in that the pigments are organic and inorganic.

* * * * *

UNITED STATES PATENT AND TRADEMARK OFFICE
CERTIFICATE OF CORRECTION

PATENT NO. : 4,973,621

DATED : November 27, 1990

INVENTOR(S) : Roelof BUTER

It is certified that error appears in the above-identified patent and that said Letters Patent is hereby corrected as shown below:

ON THE TITLE PAGE,
IN THE ABSTRACT:

Line 5, change "polymeer" to --polymer--.

Line 9, change "mol" to --mole--.

Lines 17-18, change "polymner" to --polymer--.

Col. 1, lines 7-9, delete "An aqueous coating composition based on a dispersion of an addition polymer, especially suited to be used in an aqueous base coat".

Col. 2, line 9, change "0,1-9" to --0.1-9--.

Col. 9, line 4, change "0,24" to --0.24--;

line 8, after "of" insert --:--.

Col. 10, in the Table, change all "," to --.--.

Col. 11, in the Tables, change all "," to --.--.

UNITED STATES PATENT AND TRADEMARK OFFICE
CERTIFICATE OF CORRECTION

PATENT NO. : 4,973,621

DATED : November 27, 1990

INVENTOR(S) : Roelof BUTER

It is certified that error appears in the above-identified patent and that said Letters Patent is hereby corrected as shown below:

Col. 12, in the Table, change all "," to --.--.

Signed and Sealed this

Fourteenth Day of July, 1992

Attest:

DOUGLAS B. COMER

*Attesting Officer*          *Acting Commissioner of Patents and Trademarks*